Feb. 24, 1942. C. W. GOODWIN ET AL 2,274,610
APPARATUS FOR WAX TREATING PAPER DISKS AND THE LIKE
Filed May 1, 1940 5 Sheets-Sheet 1
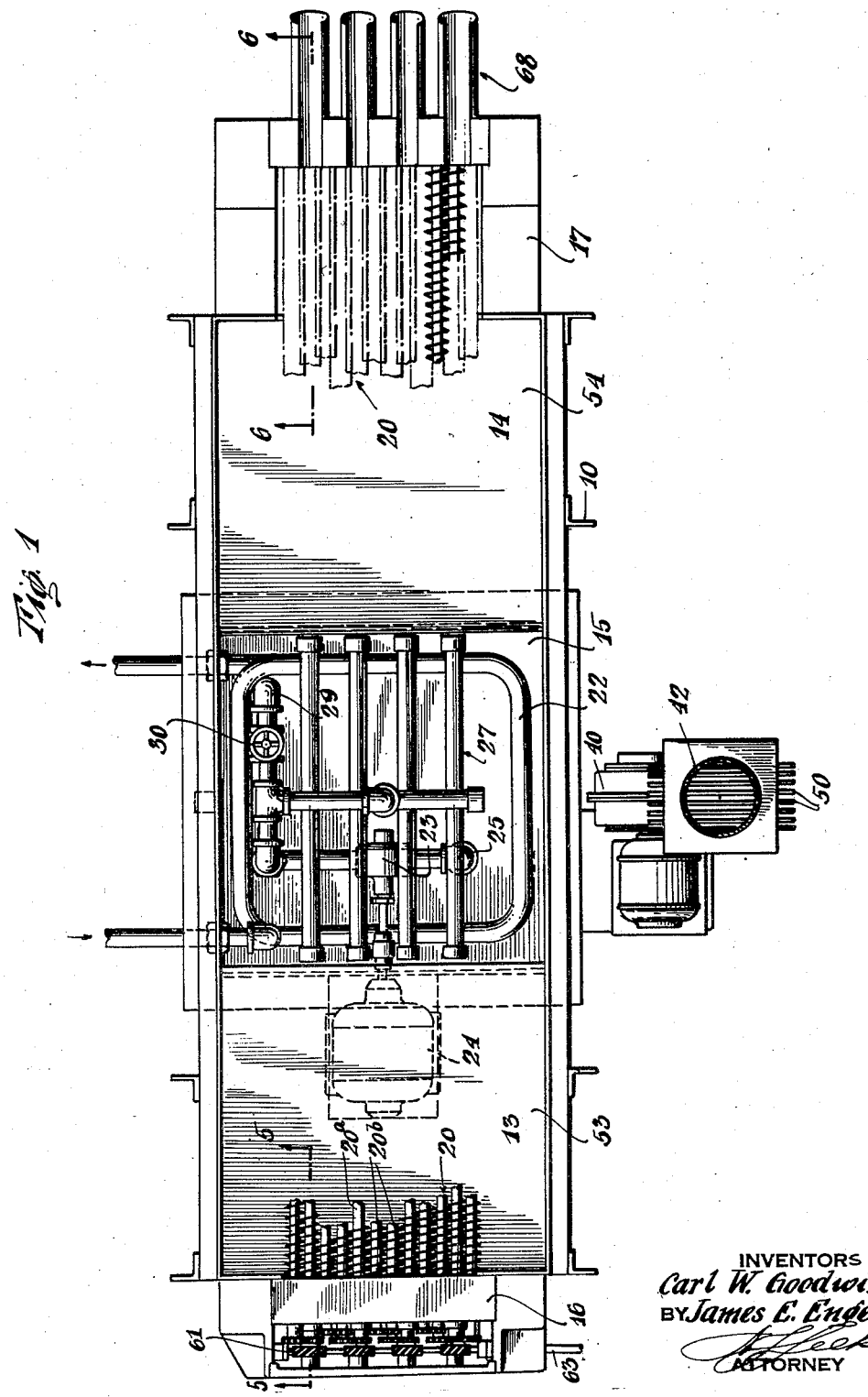
INVENTORS
Carl W. Goodwin
BY James E. Engel
ATTORNEY Feb. 24, 1942.  C. W. GOODWIN ET AL  2,274,610
APPARATUS FOR WAX TREATING PAPER DISKS AND THE LIKE
Filed May 1, 1940  5 Sheets-Sheet 2
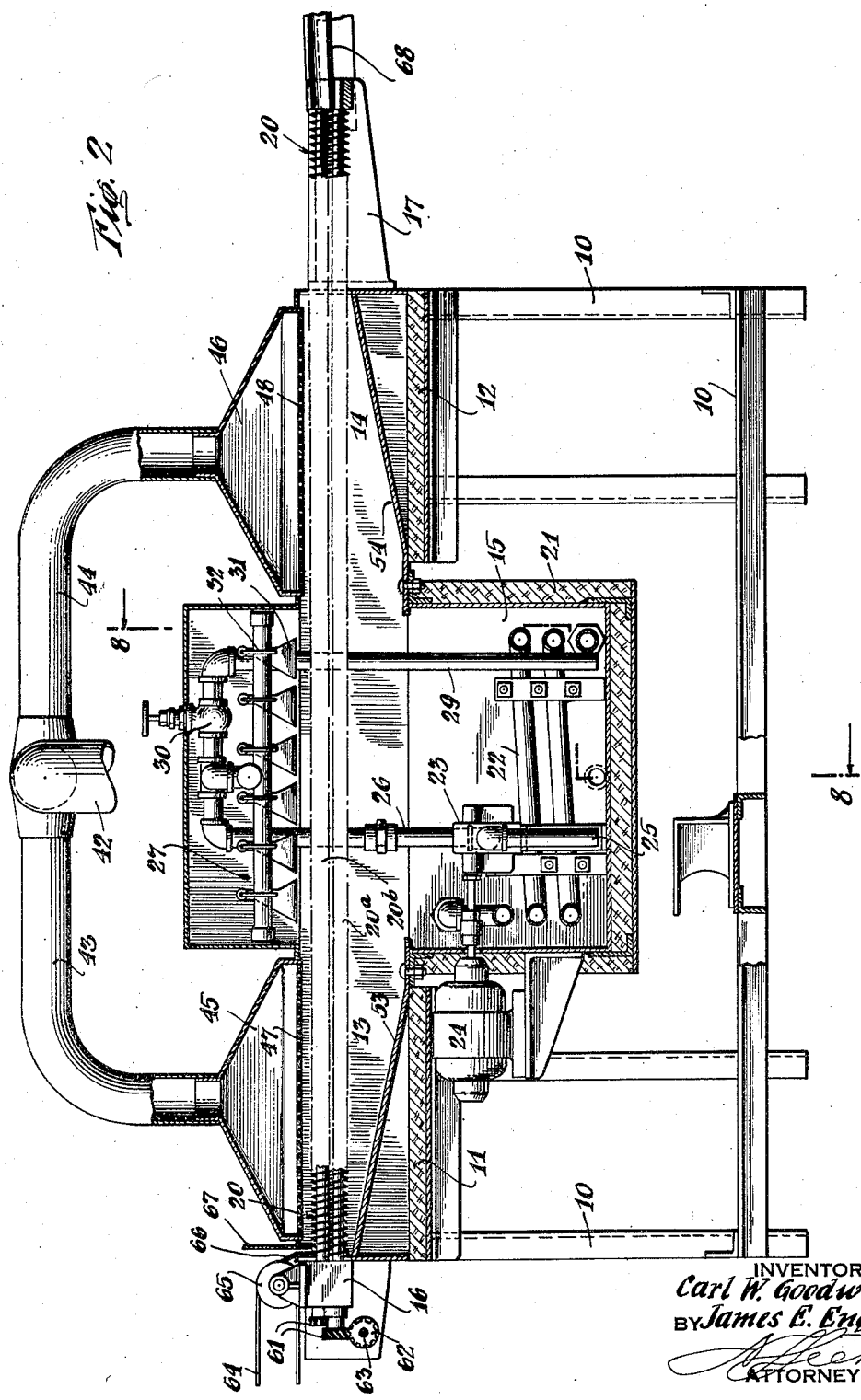
INVENTORS
Carl W. Goodwin
BY James E. Engel
ATTORNEY Feb. 24, 1942. C. W. GOODWIN ET AL 2,274,610
APPARATUS FOR WAX TREATING PAPER DISKS AND THE LIKE
Filed May 1, 1940 5 Sheets-Sheet 3
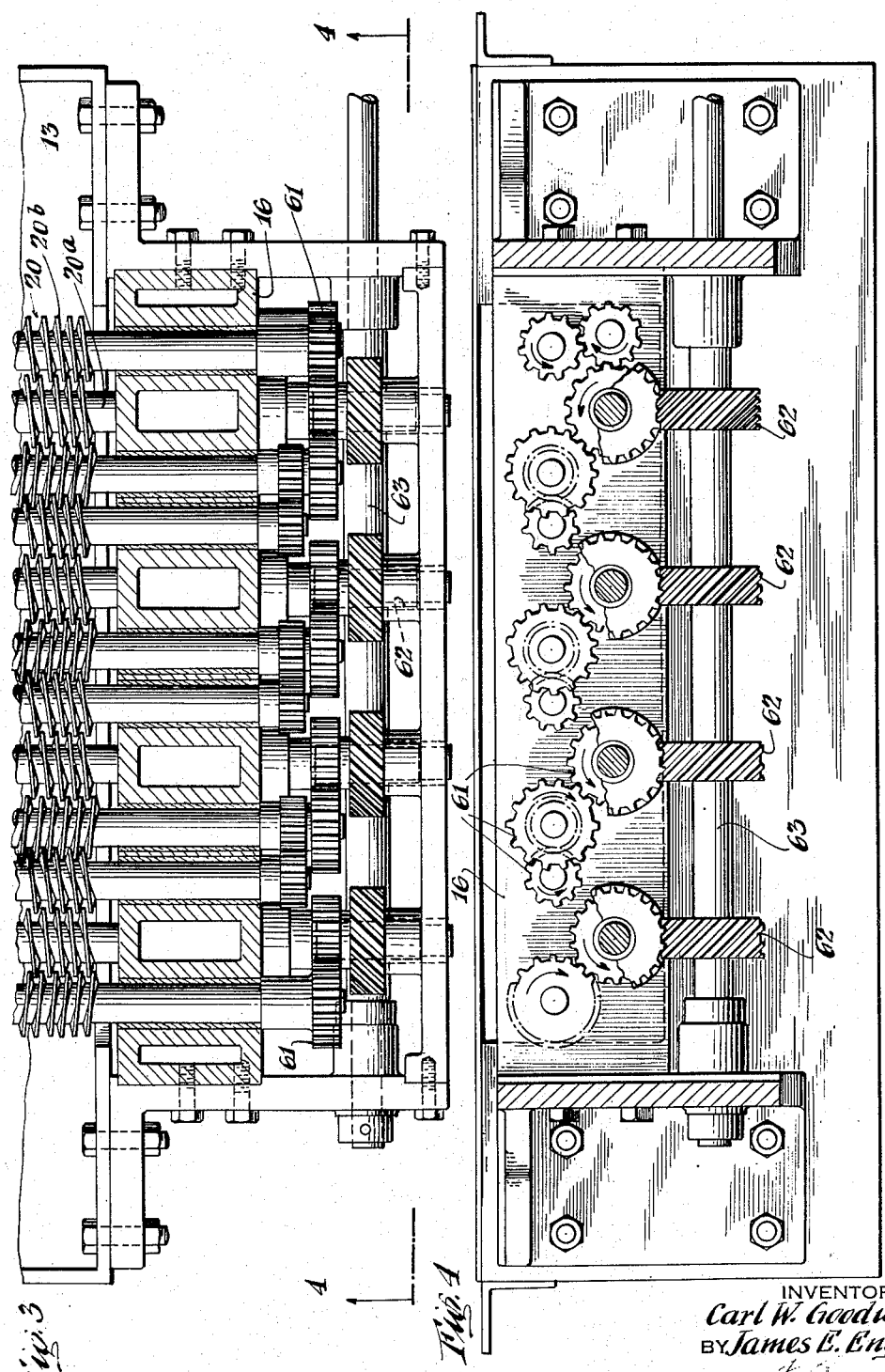
INVENTORS
Carl W. Goodwin
BY James E. Engel
ATTORNEY

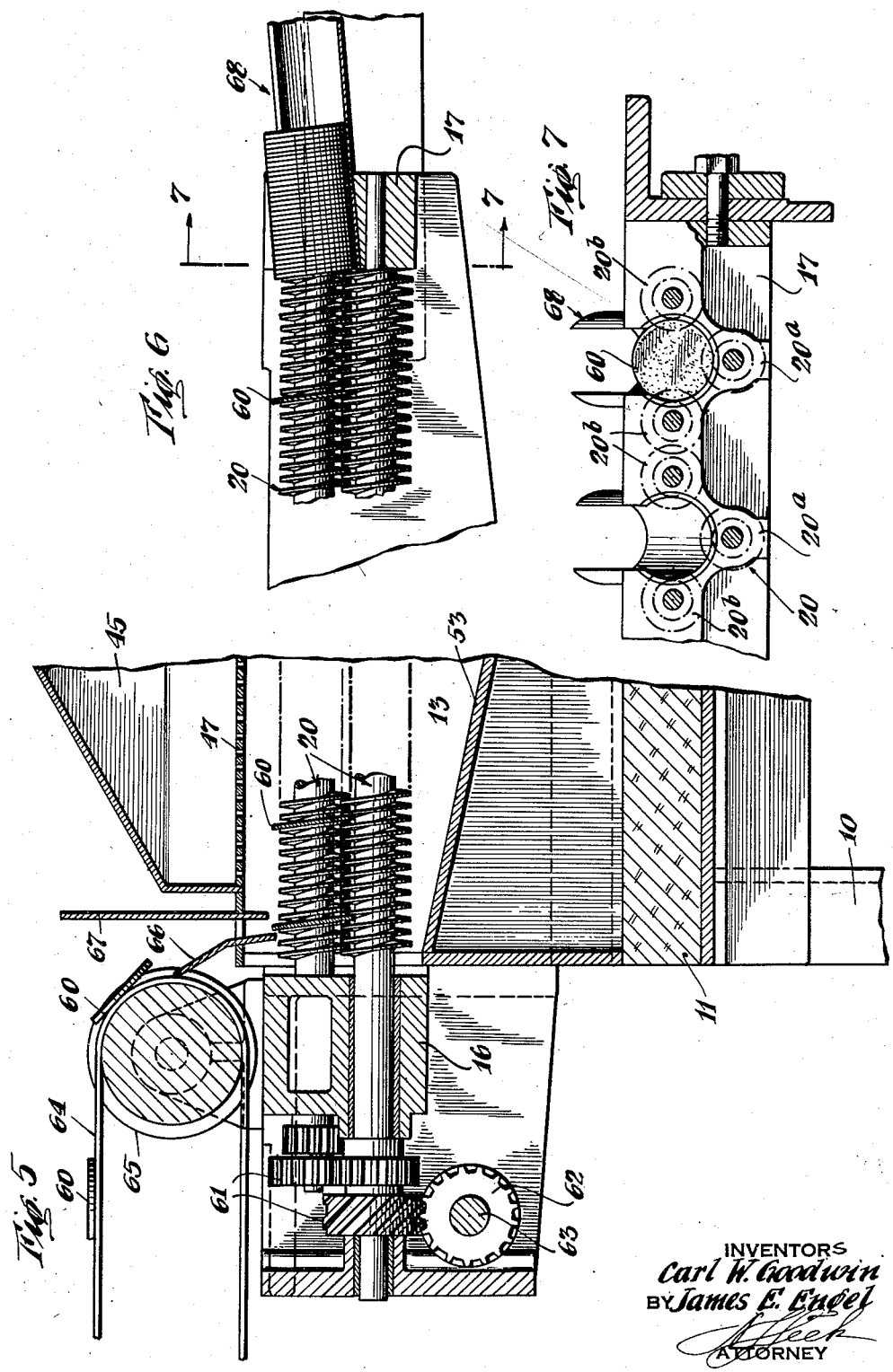

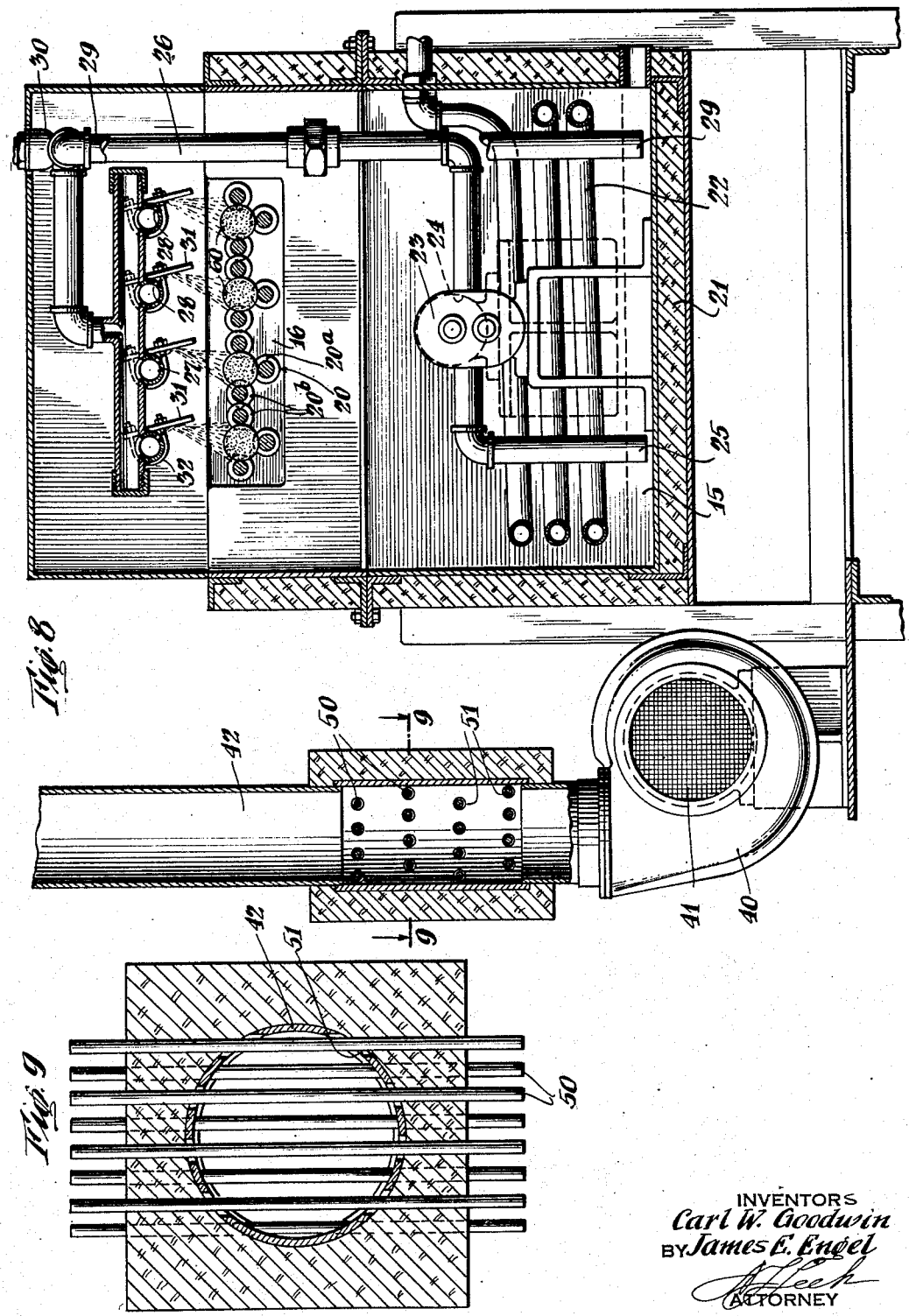

Patented Feb. 24, 1942

2,274,610

UNITED STATES PATENT OFFICE 2,274,610

APPARATUS FOR WAX TREATING PAPER DISKS AND THE LIKE

Carl W. Goodwin, Plainfield, N. J., and James E. Engel, Tottenville, N. Y., assignors to American Seal-Kap Corporation of Delaware, Wilmington, Del., a corporation of Delaware Application May 1, 1940, Serial No. 332,644

1 Claim. (Cl. 91—55)

This invention relates to the art of wax impregnating paper disks and the like and has for an object to provide a novel and improved apparatus for the above purpose.

The present invention is particularly adapted for the treatment of paper disks for milk bottles and provides a method and apparatus for impregnating said disks with wax under conditions such that a comparatively rigid, water-resistant disk is obtained. It has been found that disks of the above type tend to absorb water, principally through their edges, and that unless special precautions are taken the edges of the disks may become soft during use, with a consequent loss in holding power.

The present invention provides an apparatus for waxing the disks under conditions such that the wax is absorbed into the fibers of the disk through the sides and also from the raw edges thereof. In one embodiment of the invention this is accomplished by first preheating the disks to a temperature substantially equal to that of the molten wax which is to be applied thereto and then spraying the wax onto the edges of the disk in a spraying zone, after which the disks are passed through a heated impregnating zone wherein they are maintained hot a sufficient length of time to permit the wax to become absorbed into the fibers.

The mechanism accordingly provides a conveyor means for feeding the disks in vertical edgewise position successively through a preheating zone, a waxing zone and an impregnating zone. Means is provided for supplying a current of hot air to the disks in the preheating and impregnating zones for the purpose above indicated. In the waxing zone the disks are passed through a spray of liquid wax while they are slowly rotated by means of a screw conveyor so that the wax contacts the edge portions of the disk as well as the side faces thereof. Means is provided for adjusting the angle of the wax spray so as to obtain the most efficient operation. In the impregnating zone the disks remain heated until substantially the entire surface film of wax is absorbed therein. They may then be stacked without danger of the disks subsequently sticking together due to surface wax.

Although the novel features which are believed to be characteristic of this invention are more particularly pointed out in the claim appended hereto, the invention itself may be better understood by referring to the following description, taken in connection with the accompanying drawings forming a part thereof, in which a specific embodiment has been set forth for purposes of illustration.

In the drawings:

Fig. 1 is a top plan view of a waxing machine embodying the present invention with parts broken away to show the construction thereof.

Fig. 2 is a side elevation partly in section showing the construction of the machine;

Fig. 3 is a detail view of the drive mechanism for the screw conveyors;

Fig. 4 is a section taken on the line 4—4 of Fig. 3;

Fig. 5 is an enlarged section taken on the line 5—5 of Fig. 1;

Fig. 6 is an enlarged section taken on the line 6—6 of Fig. 1;

Fig. 7 is a section taken on the line 7—7 of Fig. 6;

Fig. 8 is a section taken on the line 8—8 of Fig. 2; and

Fig. 9 is a section taken on the line 9—9 of Fig. 8.

In the following description and in the claim certain specific terms are used for convenience in referring to various details of the invention. These terms, however, are to be given as broad an interpretation as the state of the art will permit.

Referring to the drawings more in detail, the invention is shown as applied to a machine comprising a frame 10, Fig. 2, carrying bed plates 11 and 12 forming the bottoms of a preheating chamber 13 and an impregnating chamber 14 respectively, and carrying a wax reservoir 15. Bearing brackets 16 and 17 are secured to the frame 10 at opposite ends of the machine to support the screw conveyors 20, to be described.

The wax reservoir 15 is provided with suitable heat insulation 21 and contains a heating mechanism, shown as a steam coil, by which the wax is maintained in liquid condition. A pump 23, operated by a motor 24, removes liquid wax from the reservoir 15 through a supply pipe 25 and feeds the same through a pipe 26 to a spray manifold 27 by means of which the wax is supplied to a plurality of nozzles 28. A wax return pipe 29 is connected to the pipe 26 and may be controlled by a valve 30 to provide regulation for the supply of wax to the nozzles 28. The nozzles 28, as shown in Fig. 8, are provided with baffle plates 31 which may be adjusted by means of collars 32 to vary the angle of the wax spray as desired. The nozzles 28 are arranged over the wax reservoir 15 so that the excess wax is returned thereto by gravity.

For supplying heated air to the preheating chamber 13 and to the impregnating chamber 14, a fan 40 is provided (Fig. 8) which receives air through an axial port 41 and supplies the same through a duct 42 to branch ducts 43 and 44, Fig. 2, leading to hoods 45 and 46 respectively which are located over the preheating and impregnating chambers. The hoods 45 and 46 may be provided with perforated plates 47 and 48 through which the air is supplied to the above mentioned chambers. The plates 47 and 48 control the heat and the flow of air to the respective chambers. The perforations may direct the air onto the disks. Suitable heating means shown as electrical heating rods 50 (Figs. 1, 8 and 9), are located in the duct 42 in a position to heat the air as it passes therethrough. The duct 42 may be formed with enlarged apertures 51 which provide clearance to prevent electrical contact between the rods 50 and the walls of the duct. It is to be understood, however, that other heating means may be employed if desired. Inclined plates 53 and 54 are provided in the preheating chamber 13 and the impregnating chamber 14 for the purpose of directing the heated air, and any wax which may be present in said chambers, into the wax reservoir 15.

For feeding the disks, a plurality of screw conveyors 20 are provided. These conveyors are arranged in groups of three as shown in Figs. 7 and 8, each group comprising a lower conveyor 20a and a pair of side conveyors 20b which are arranged to receive a disk 60, Fig. 5, therebetween so as to support and feed the disk in an upright position. The conveyors 20 are mounted in bearing brackets 16 and 17 and are provided at their ends with gear wheels 61, Figs. 3 and 4, meshing with spiral gears 62 carried on a drive shaft 63, which is driven by suitable means, such as an electric motor not shown.

The disks are fed to the conveyor by a belt 64 passing around an idler pulley 65 and discharging the disks 60 between guide plates 66 and 67 which are arranged to cause the disks to fall edgewise onto the various screw conveyors and to be picked up and fed in this vertical edgewise position, as shown in Fig. 5. After treatment the disks are fed by the conveyor to receivers 68 in which they are stacked as shown in Fig. 6.

In the operation of this device, the wax is maintained at the desired temperature in the reservoir 15 by means of the steam coil 22 and is continuously sprayed through the nozzles 28 by means of the pump 23. The temperature in the preheating chamber 13 and in the impregnating chamber 14 is controlled by means of the heater rods 50 and by varying the speed of the operation of the blower 40. The length of treatment of the disks is also controlled by means of the speed of the screw conveyors 20. In normal operation the disks remain in the preheating zone 13 a sufficient length of time so that they are raised in temperature to at least the temperature of the liquid wax which is to be sprayed thereon. As the disks pass through the spraying zone, they receive a coating of liquid wax which extends over the sides and edges thereof. The disks are rotated by the screw conveyors as they pass through this spraying zone so that all of the edge portions of the disk are subjected to the action of the spray.

The disks now pass to the impregnating zone 14 wherein they are maintained at a temperature above the melting point of the wax a sufficient length of time to permit the wax to be absorbed into the fibres of the disk. Preferably the conditions are so controlled that when the disks emerge from the impregnating zone the surface film of wax has practically disappeared by absorption into the fibres. The disks are then stacked in the receivers 68 and may be stored for a further period of time to allow the same to cool. During the cooling of the disks any further traces of external wax are removed by absorption, so that when cool the tendency to adhere together is practically eliminated. The disks are accordingly in suitable condition to be supplied to a capping machine by means of the usual feed mechanism which is adaped to remove the disks successively from the stack and apply the same to a bottle.

It will be noted that the above described mechanism provides for the uniform treatment of the edges of the disk under conditions such that the wax is absorbed into the exposed fibres of the raw edge as well as through the sides of the disk. In this way a maximum amount of wax is obtained at the edges where the tendency to absorb water is the greatest. It has been found that the above described operations result in a high water resistivity with the use of a minimum amount of wax. It is also to be noted that the waste is practically eliminated as all of the wax which drains from the disks and is not absorbed into the fibres flows back into the wax reservoir. Furthermore, the preheating of the disks prevents the wax from solidifying when it comes in contact with the cold disk and thereby depositing an insulating film over the surface thereof. In this way a maximum amount of impregnation is obtained during the travel of the disks through the machine.

Although a specific embodiment of the invention has been shown for purposes of illustration, it is to be understood that the invention is capable of various uses and that changes and modifications may be made therein as will readily appear to a person skilled in the art. The invention is only to be limited in accordance with the following claim.

What is claimed is:

A device for wax treating paper disks or the like, comprising a casing forming a single elongated chamber having connecting central and end sections, screw conveyor means to advance a series of said disks in spaced, vertical edgewise position through said chamber and to continuously rotate said disk during said passage, a wax reservoir below said central section and open thereto, heating means in said reservoir to maintain the wax therein in liquid condition, a set of spray nozzles over said open reservoir, extending along the path of movement of said disks in said central section and positioned to direct a spray of liquid wax against said disks as they pass therethrough, the excess spray falling back directly into said reservoir, hoods over said end sections and means supplying heated air through said heads downwardly onto the disks in said sections for heating the same and for assisting in the return flow of the wax drippings along said sloping bottom members to said reservoir.

CARL W. GOODWIN.
JAMES E. ENGEL.